(12) United States Patent
Guenter

(10) Patent No.: US 10,504,397 B2
(45) Date of Patent: Dec. 10, 2019

(54) CURVED NARROWBAND ILLUMINANT DISPLAY FOR HEAD MOUNTED DISPLAY

(71) Applicant: Microsoft Technology Licensing, LLC, Redmond, WA (US)

(72) Inventor: Brian K. Guenter, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 26 days.

(21) Appl. No.: 15/421,228

(22) Filed: Jan. 31, 2017

(65) Prior Publication Data

US 2018/0218661 A1    Aug. 2, 2018

(51) Int. Cl.
| | | |
|---|---|---|
| G09G 3/20 | (2006.01) | |
| G09G 3/00 | (2006.01) | |
| G02B 27/00 | (2006.01) | |
| G02B 27/01 | (2006.01) | |

(52) U.S. Cl.
CPC ....... *G09G 3/2003* (2013.01); *G02B 27/0025* (2013.01); *G02B 27/0101* (2013.01); *G09G 3/006* (2013.01); *G02B 2027/011* (2013.01); *G09G 2320/0666* (2013.01)

(58) Field of Classification Search
CPC .................................................. G09G 3/2003
USPC ........................................................ 345/589
See application file for complete search history.

(56) References Cited

U.S. PATENT DOCUMENTS

| | | |
|---|---|---|
| 5,604,856 A | 2/1997 | Guenter |
| 6,193,660 B1 | 2/2001 | Jackson et al. |
| 6,252,989 B1 | 6/2001 | Geisler et al. |
| 6,340,994 B1 | 1/2002 | Margulis et al. |
| 6,462,768 B1 | 10/2002 | Oakley |
| 6,549,215 B2 | 4/2003 | Jouppi |
| 7,148,860 B2 | 12/2006 | Kooi et al. |
| 7,499,594 B2 | 3/2009 | Kortum et al. |
| 7,542,090 B1 | 6/2009 | Merchant |
| 7,872,635 B2 | 1/2011 | Mitchell |
| 8,223,024 B1 | 7/2012 | Petrou |
| 8,379,915 B2 | 2/2013 | Sharon et al. |
| 8,401,081 B2 | 3/2013 | Doser |
| 8,872,910 B1 | 10/2014 | Vaziri |

(Continued)

OTHER PUBLICATIONS

Rolland, et al., "Head-Mounted Display Systems", In Journal of Encyclopedia of optical engineering, Mar. 2005, pp. 1-14.

(Continued)

*Primary Examiner* — Shivang I Patel

(57) ABSTRACT

A curved narrowband illuminant display is provided. A head mounted display is provided that includes a first lens having a first curvature. The first lens is focused on the curved display, and the display has a curvature such that the field curvature of the lens is corrected by the curvature of the display. In addition, a coherent fiber optic bundle sheet may be mounted on the display, wherein the coherent fiber optic bundle sheet has a curvature such that the field curvature of the lens is corrected by the curvature of the coherent fiber optic bundle sheet. According to another aspect, when a planar image is received, distortion for red, green, and blue images that comprise the planar image may be generated, undistorted red, green, and blue images may be generated, and the undistorted red, green, and blue images may be displayed.

20 Claims, 7 Drawing Sheets

(56) References Cited

U.S. PATENT DOCUMENTS

| | | |
|---|---|---|
| 8,885,882 B1 | 11/2014 | Yin et al. |
| 8,937,771 B2 | 1/2015 | Robbins |
| 9,030,583 B2 | 5/2015 | Gove et al. |
| 9,094,677 B1 | 7/2015 | Mendis et al. |
| 9,366,862 B2 | 6/2016 | Haddick et al. |
| 9,377,852 B1 | 6/2016 | Shapiro et al. |
| 10,298,840 B2 | 5/2019 | Guenter |
| 10,354,140 B2 | 7/2019 | Guenter et al. |
| 2002/0063726 A1 | 5/2002 | Jouppi |
| 2003/0198393 A1 | 10/2003 | Berstis |
| 2004/0102713 A1 | 5/2004 | Dunn |
| 2004/0130649 A1 | 7/2004 | Lee |
| 2004/0247167 A1 | 12/2004 | Bueno et al. |
| 2005/0007453 A1 | 1/2005 | Ahiska |
| 2005/0017923 A1 | 1/2005 | Kooi et al. |
| 2005/0018911 A1 | 1/2005 | Deever |
| 2005/0096543 A1 | 5/2005 | Jackson et al. |
| 2006/0221067 A1 | 10/2006 | Kim et al. |
| 2007/0177239 A1 | 1/2007 | Tanijiri et al. |
| 2008/0002262 A1 | 1/2008 | Chirieleison |
| 2008/0247620 A1 | 10/2008 | Lewis et al. |
| 2009/0040308 A1 | 2/2009 | Temovskiy |
| 2009/0116688 A1 | 5/2009 | Monacos et al. |
| 2009/0147126 A1 | 6/2009 | Miyoshi et al. |
| 2009/0153730 A1 | 6/2009 | Knee et al. |
| 2009/0175535 A1 | 7/2009 | Mattox |
| 2010/0090929 A1 | 4/2010 | Tsujimoto |
| 2010/0142778 A1 | 6/2010 | Zhuo et al. |
| 2012/0105310 A1 | 5/2012 | Sverdrup et al. |
| 2012/0146891 A1 | 6/2012 | Kalinli |
| 2012/0176296 A1 | 7/2012 | Border et al. |
| 2012/0300112 A1 | 11/2012 | Natsume |
| 2013/0050485 A1 | 2/2013 | Tiana |
| 2013/0125155 A1 | 5/2013 | Bhagavathy et al. |
| 2013/0169683 A1 | 7/2013 | Perez et al. |
| 2013/0285885 A1 | 10/2013 | Nowatzyk et al. |
| 2014/0085505 A1 | 3/2014 | Asuka et al. |
| 2014/0125785 A1 | 5/2014 | Na et al. |
| 2014/0218468 A1 | 8/2014 | Gao et al. |
| 2014/0247277 A1 | 9/2014 | Guenter et al. |
| 2014/0247286 A1 | 9/2014 | Chi |
| 2014/0266990 A1 | 9/2014 | Makino et al. |
| 2014/0268360 A1 | 9/2014 | Ellsworth |
| 2014/0361977 A1 | 12/2014 | Stafford et al. |
| 2014/0375680 A1 | 12/2014 | Ackerman et al. |
| 2015/0042814 A1 | 2/2015 | Vaziri |
| 2015/0235453 A1 | 8/2015 | Schowengerdt et al. |
| 2016/0034032 A1 | 2/2016 | Jeong |
| 2016/0080653 A1 | 3/2016 | Kim et al. |
| 2016/0109712 A1 | 4/2016 | Harrison et al. |
| 2016/0187969 A1 | 6/2016 | Larsen et al. |
| 2016/0246055 A1* | 8/2016 | Border ............... G02B 27/017 |
| 2016/0320559 A1* | 11/2016 | Richards ............... G02B 6/06 |
| 2016/0328030 A1 | 11/2016 | Kimura et al. |
| 2017/0359510 A1 | 12/2017 | Lane |
| 2018/0035058 A1 | 2/2018 | Thumpudi et al. |
| 2018/0075653 A1 | 3/2018 | Schillings |
| 2018/0217383 A1 | 8/2018 | Guenter |
| 2018/0218217 A1 | 8/2018 | Guenter et al. |
| 2018/0220068 A1 | 8/2018 | Guenter |
| 2019/0286909 A1 | 9/2019 | Guenter et al. |

OTHER PUBLICATIONS

Guenter, et al., "Foveated 3D Graphics", In Journal of ACM Transactions on Graphics, vol. 31, Issue 6, Nov. 2012, 10 Pages.

Guenter, et al., "Supplement to Foveated 3D Graphics: User Study Details", Retrieved from <<https://www.microsoft.com/en-us/research/wp-content/uploads/2012/11/userstudy07.pdf>>, Jan. 1, 2012, 4 Pages.

Jin, et al., "Analysis and Processing of Pixel Binning for Color Image Sensor", In EURASIP Journal on Advances in Signal Processing, vol. 1, Jun. 21, 2012, 22 Pages.

Lavalle, Steven M., "The Physiology of Human Vision", In Book of Virtual Reality, Chapter 5, Jan. 2015, 17 Pages.

Poletti, et al., "Microscopic Eye Movements Compensate for Non-homogeneous Vision within the Fovea", In Journal of Current Biology, vol. 23, Issue 17, Sep. 9, 2013, 5 Pages.

Stengel, et al., "An Affordable Solution for Binocular Eye Tracking and Calibration in Head-mounted Displays", In Proceedings of the 23rd ACM international conference on Multimedia, Oct. 26, 2015, 10 Pages.

"Notice of Allowance" issued in U.S. Appl. No. 15/421,185, dated Oct. 1, 2018, 9 pages.

"International Search Report and Written Report issued in PCT Application No. PCT/US2018/016187", dated Aug. 21, 2018, 15 Pages.

"Final Office Action Issued in U.S. Appl. No. 15/421,150", dated Nov. 23, 2018, 28 Pages.

"Non Final Office Action Issued in U.S. Appl. No. 15/421,252", dated Nov. 1, 2018, 18 Pages.

"Non Final Office Action Issued in U.S. Appl. No. 15/421,150", dated May 31, 2018, 34 Pages.

"Non Final Office Action Issued in U.S. Appl. No. 15/421,185", dated May 17, 2018, 23 Pages.

"Final Office Action Issued in U.S. Appl. No. 15/421,252", dated May 16, 2019, 19 Pages.

"Non-Final Office Action Issued in U.S. Appl. No. 16/431,606", dated Aug. 5, 2019, 32 Pages.

"Non-Final Office Action Issued in U.S. Appl. No. 15/421,252", dated Oct. 3, 2019, 21 Pages.

* cited by examiner

MOBILE COMPUTING DEVICE

CURVED NARROWBAND ILLUMINANT DISPLAY FOR HEAD MOUNTED DISPLAY

BACKGROUND

Augmented and virtual reality are becoming a greater part of the computer user experience. Through augmented reality, a computer user wears a head mounted display that projects computer generated images onto a real-world scene, thus augmenting the scene with computer generated information. This information can be in the form of graphics or text. Cameras mounted on the head mounted display pick up the images of what the user is looking at in the real world. Virtual reality is similar to augmented reality except for the fact that the entire display that the user sees is generated by a computer; there are generally no cameras and no display of the local surroundings.

The head mounted display ("HMD") usually contains two simple single element lenses, one for each eye, that focus on two respective flat panel displays. Each display is approximately two inches square and placed very close to the lenses and the user's eyes. Because of weight and size restrictions of HMDs only simple optical systems are practical. For example, the vast majority of commercially available HMDs use single element optical systems, although multiple element systems are possible. Simple optical systems have two primary lens aberrations that affect image quality: field curvature and chromatic aberration. Field curvature is a problem because a single element lens is really designed to clearly focus on a spherical surface; however, in an HMD they are focusing on a flat surface. Thus, one sees significant distortions or aberrations at the edges of the display. The second drawback of chromatic aberration is specifically lateral chromatic aberration that causes different wavelengths of light to have different magnifications. In other words, blue images will have a different magnification than red images or green images. So, it looks like there are three different slightly misaligned images in the display. Correcting for these aberrations is difficult.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to a curved narrowband illuminant display for a head mounted display. A head mounted display is provided that includes: a first lens having a first curvature; and a curved display upon which the first lens is focused, the display having a curvature such that the field curvature of the lens is corrected by the curvature of the display.

Additional aspects include a head mounted display that includes: a first lens having a first curvature; a display upon which the first lens is focused; and a coherent fiber optic bundle sheet mounted on the display, wherein the coherent fiber optic bundle sheet has a curvature such that the field curvature of the lens is corrected by the curvature of the coherent fiber optic bundle sheet.

Additional aspects include a method of correcting chromatic aberration in a display. The method includes: receiving a planar image; computing distortion for the red, green, and blue images that comprise the planar image; generating undistorted red, green, and blue images; and displaying the undistorted red, green, and blue images.

Examples are implemented as a method, computer process, a computing system, or as an article of manufacture such as a device, computer program product, or computer readable medium. According to an aspect, the computer program product is a computer storage medium readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
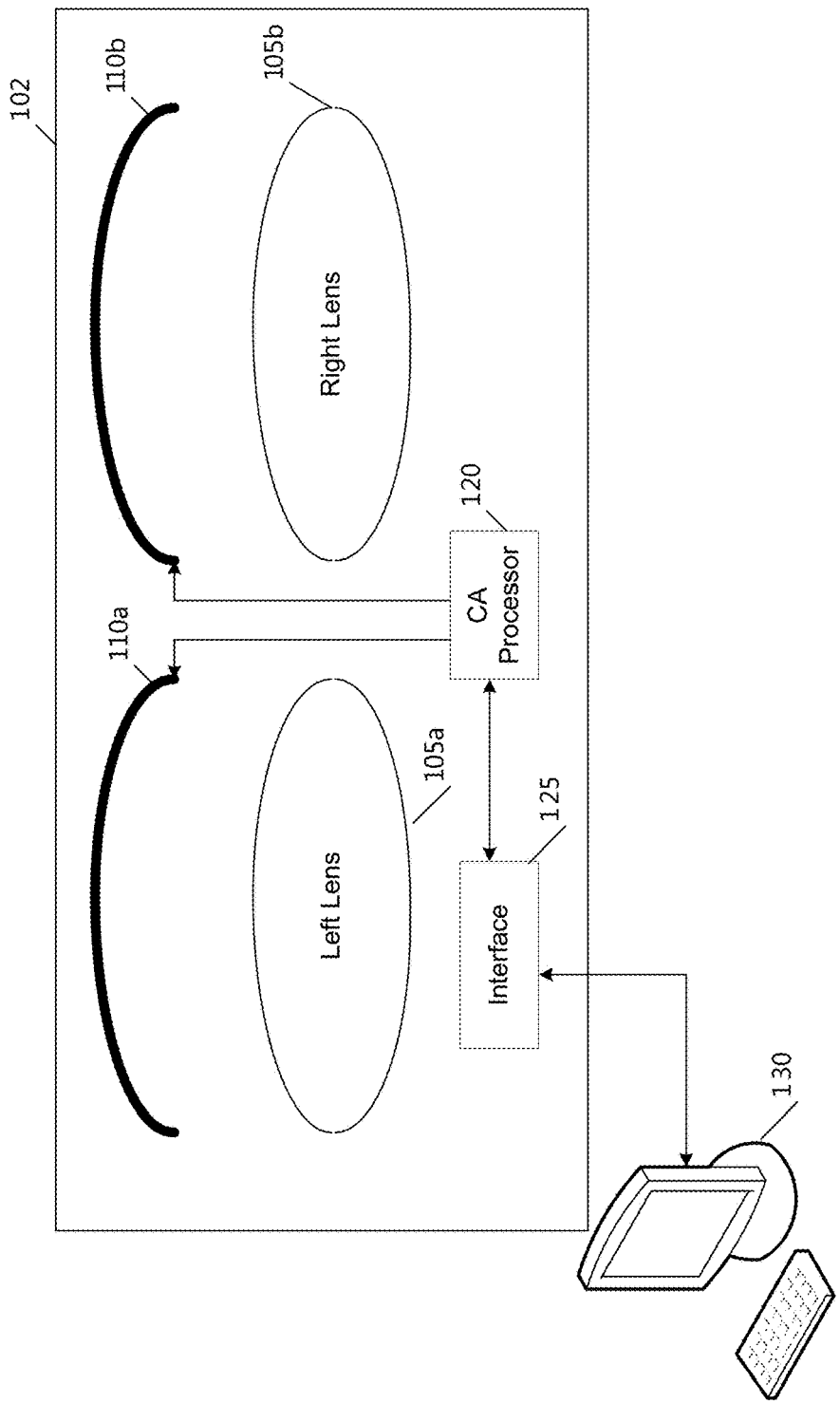
FIG. 1 is a block diagram of an example head mounted display that corrects for field curvature by curving the display screens.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method and system for video noise reduction for video augmented reality systems. In order to make a head mounted display as light as possible, single element lenses are typically used. As described in the Background, when a single element lens is used to view a planar display, field curvature is one problem. The present disclosure corrects for field curvature by using two techniques, either alone or in combination. A first technique actually bends the display, so that it is no longer planar and the single element lens is able to view a curved field as it is generally designed to do. That eliminates or significantly reduces the field curvature problem. The display may be bent into a hemispherical shape or cylindrical shape.

A second technique to eliminate field curvature is, instead of bending the displays, using a sheet of fiber optic bundles to overlay the display. The sheet is then ground into a hemispherical shape. As these coherent fiber optic bundles have the property of making whatever image is on the back of the bundle translated to the front of the bundle, it acts similarly to actually curing the display into a hemispherical display.

In addition, the above two techniques can be used in combination. For example, the display could be spherically curved as far as possible without breaking, and a faceplate could be affixed to the curved display. The front of the faceplate could be ground to a higher degree of curvature than the degrees of curvature of the display. This reduces the thickness and weight of the faceplate.

Similarly, if the display is bent cylindrically, a fiber optic faceplate may be bonded to the cylindrical surface and ground into a spherical shape. This, also, would reduce the volume, and weight, of the faceplate material.

The faceplate may also be heated and cylindrically bent to match the curvature of the cylindrical display. Then, it would be bonded to the display and the front surface of the faceplate would be ground into a spherical shape.

A second problem with a single element lens is lateral chromatic aberration. Although typically corrected through the use of a second lens, this is not possible in a head mounted display which is being kept as light as possible. Lateral chromatic aberration is where the different wavelengths of light are subject to different magnifications, so red light, green light, and blue light have different magnifications. As these wavelengths of light each cover approximately 70 nm of bandwidth in the visible spectrum, this makes it impossible to correct for the chromatic aberration; the bandwidth is simply too broad. However, if the bandwidth for each of these colors is reduced, say to approximately 5 nm, then software can correct for the lateral chromatic aberration at these bandwidths. For transmissive displays, a backlight can be created where the red, green, and blue lights are at these narrow 5 nm bandwidths. For emissive displays, such as OLEDs (Organic Light Emitting Diodes), color filters or quantum dots can be used to narrow the bandwidth. Once the bandwidths have been narrowed, then software can change the respective red, green, and blue images to correct the lateral chromatic aberration.

FIG. 1 is a block diagram of an example head mounted display that corrects for field curvature by curving the display screens. In the figure, an HMD (head mounted display) 102 is illustrated. The HMD 102 includes two single element lenses 105a and 105b that are focused on two curved displays 110a and 110b. These displays 110 may be curved by pressing them into a mold. If the curvature of the displays 110 would cause cracking during molding, a series of slits, e.g. four to five slits, may be placed in the displays 110 prior to bending them. Again, bending the displays 110, which is shown somewhat exaggerated here, serves to correct the field curvature present in a single lens system.

Further included in the HMD 102 is a chromatic aberration processor 120 for correcting chromatic aberration which is coupled to both the displays 110 and an interface 125 for connecting to a computer 130. Discussion of the chromatic aberration processor will be discussed more fully with respect to the flowchart of FIG. 4. Chromatic aberration may be corrected within the chromatic aberration processor 120 or within the computer 130.

Figure 2:
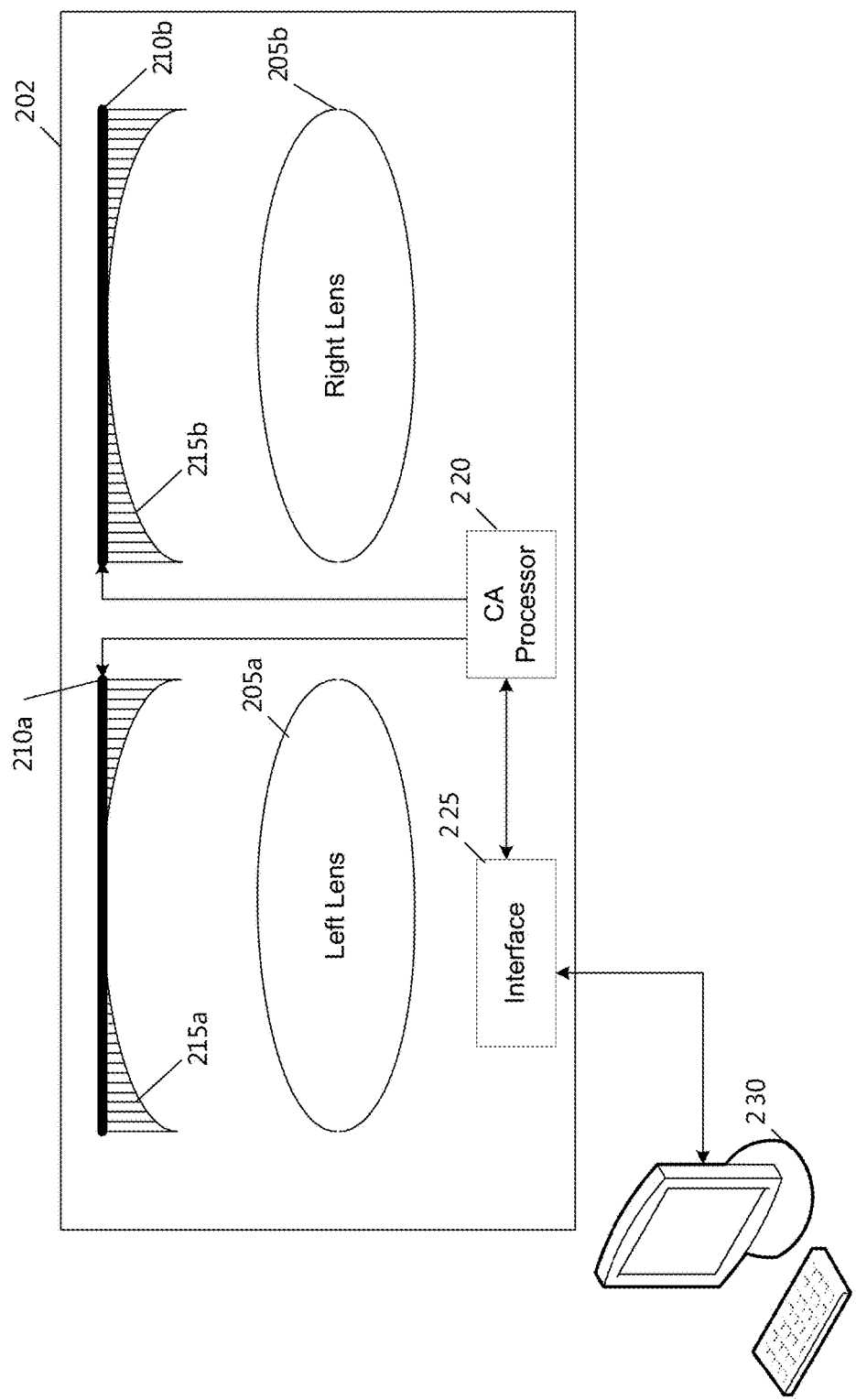
FIG. 2 is a block diagram of an example head mounted display that corrects for field curvature by using fiber optic bundles.

FIG. 2 is a block diagram of an example head mounted display that corrects for field curvature by using fiber optic bundles. In this alternative HMD 202, instead of curving the displays 210, a sheet containing coherent fiber optic bundles (also referred to as a faceplate) 215 is placed on the flat displays 210. The sheet of coherent fiber optic bundles 215 is ground to form a spherical surface. The coherent fiber optic bundles 215 transmit the light from the display 210 from the back of the bundles 215 to the front of the bundles 215. Thus, the image from the display 210 is transferred to the front of the sheet of coherent fiber optic bundles 215. This forms the spherical surface that corrects for the field curvature aberration caused by the lenses 205.

Like the HMD 102, the HMD 202 contains a chromatic aberration processor 220 for correcting chromatic aberration which is coupled to both the displays 210 and an interface 225 for connecting to a computer 230. Discussion of the chromatic aberration processor 220 will be discussed more fully with respect to the flowchart of FIG. 4. Chromatic aberration may be corrected within the chromatic aberration processor 220 or within the computer 230.

As previously discussed, a combination of the above two techniques may also be employed, wherein the displays 210 can be bent into a spherical or cylindrical shape and a sheet having coherent optical bundles 215 (known as a faceplate) would be affixed and further ground to have the appropriate spherical surface. The displays 210 could be spherically curved as far as possible without breaking, and a faceplate 215 could be affixed to each curved display 210. The front of the faceplates 215 could be ground to a higher degree of curvature than the degrees of curvature of the displays 210. This reduces the thickness and weight of the faceplate 215.

Similarly, if the displays 210 are bent cylindrically, fiber optic faceplates 215 may be bonded to the cylindrical surface and ground into a spherical shape. This, also, would reduce the volume, and weight, of the faceplate material. The faceplates 215 may also be heated and cylindrically bent to match the curvature of the cylindrical displays 210. Then, they would be bonded to the displays 210 and the front surface of the faceplates 215 would be ground into a spherical shape.

Figure 3:
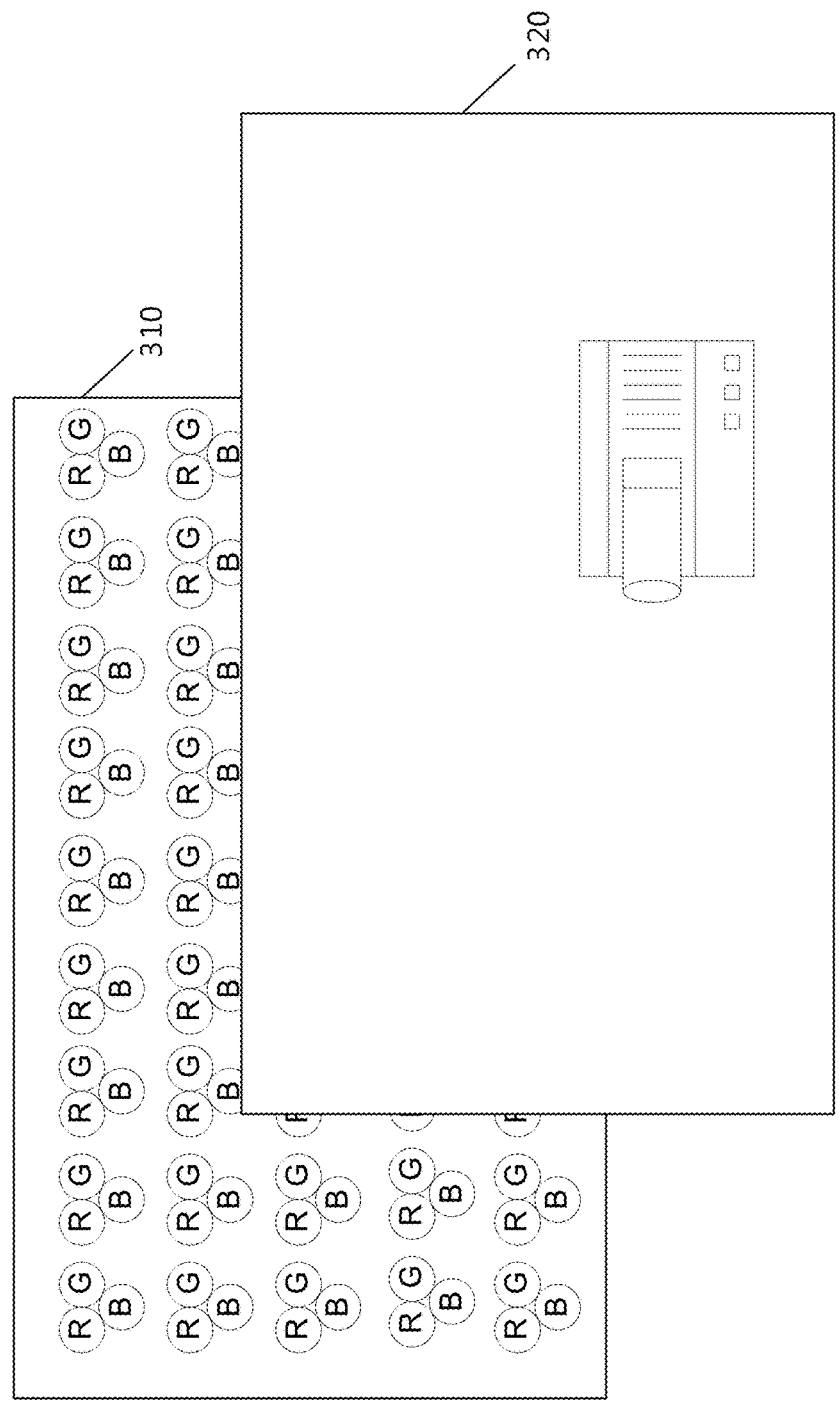
FIG. 3 is a diagram of a transmissive display that uses narrowband red, green, and blue backlighting light emitting diodes to correct for lateral chromatic aberration.

FIG. 3 is a diagram of a transmissive display that uses narrowband red, green, and blue backlighting light emitting diodes (LEDs) to correct for lateral chromatic aberration. As previously described, in order to correct for lateral chromatic aberration, one must correct for the fact that different wavelengths of light have different magnifications when using a single lens. However, traditional LED backlighting of transmissive displays uses red, green, and blue lights which have a broadband of wavelengths, typically on the order of 70 nm. This makes it not possible to software correct for chromatic aberration. In the disclosure, RGB backlights 310 are used with only a narrow band of light, approximately 5 nm, to backlight the display 320. By using only a narrow band of light for each red, green, and blue wavelength, software can correct for chromatic aberration.

In addition to transmissive displays as illustrated, it is also contemplated that emissive displays, such as organic LED's or OLEDS, could also be used. When using OLEDS, the frequency range of the red, green, and blue light may be narrowed by the use of either color filters that would be manufactured on top of the OLEDS or through the use of quantum dots to narrow the initial bandwidth of the light.

Figure 4:
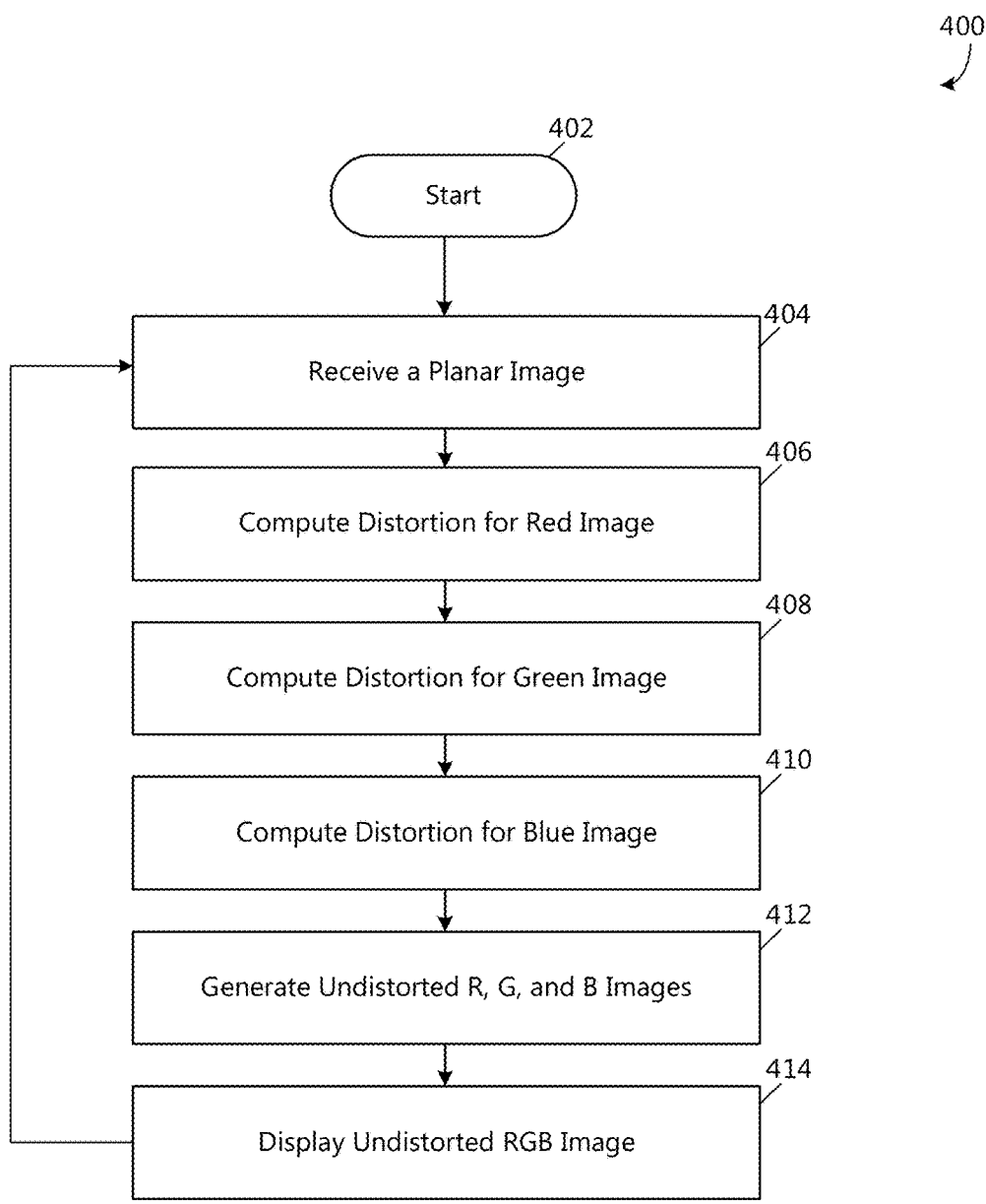
FIG. 4 is a flow chart for correcting lateral chromatic aberration in an emissive or transmissive display.

FIG. 4 is a flow chart for correcting lateral chromatic aberration in an emissive or transmissive display. Method 400 starts at OPERATION 402 and proceeds to OPERATION 404 where a planar image is received from an image generation device such as a computer. At OPERATION 406 distortion for the red part of the image is computed; at OPERATION 408 distortion for the green part of the image is computed; and at OPERATION 410 distortion for the blue part of the image is computed. Undistorted red, green, and blue images are then generated at OPERATION 412. Following undistortion, the total image would look aligned and undistorted.

There are several ways that one can accomplish undistortion. One method uses an optical simulation program that simulates the red, green, and blue light sources and computes how they would be distorted. Then, for each pixel on the display, the system would know how that pixel would have to shift in or out of the display to compensate for the distortion. An optical design software package such as ZEMAX® (provided by Zemax LLC of Kirkaland, Wash.) or CODE V® (provided by Synopsys, Inc. of Mountain View, Calif.) could be used to simulate the optical system. Another option would be to create a test pattern composed of a red, green, and blue grid that would be sent to the display. A picture of the display could be taken, and that picture would let the system know how much each pixel for each color would have to be moved in order to undistort the picture. For any of the above methods, these pixel movement values could be stored in the system for use in the distortion correction algorithm described above.

Once the red, green, and blue images have been undistorted, the undistorted RGB image is display at OPERATION 414 and flow returns to OPERATION 404.

While correction of both field curvature and lateral chromatic aberration has been described, it is possible that implementations of the disclosure may correct for both aberrations, just for field curvature, or just for lateral chromatic aberration.

The aspects and functionalities described herein may operate via a multitude of computing systems including, without limitation, head mounted displays with and without computer assistance, or head mounted displays in conjunction with desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein may operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
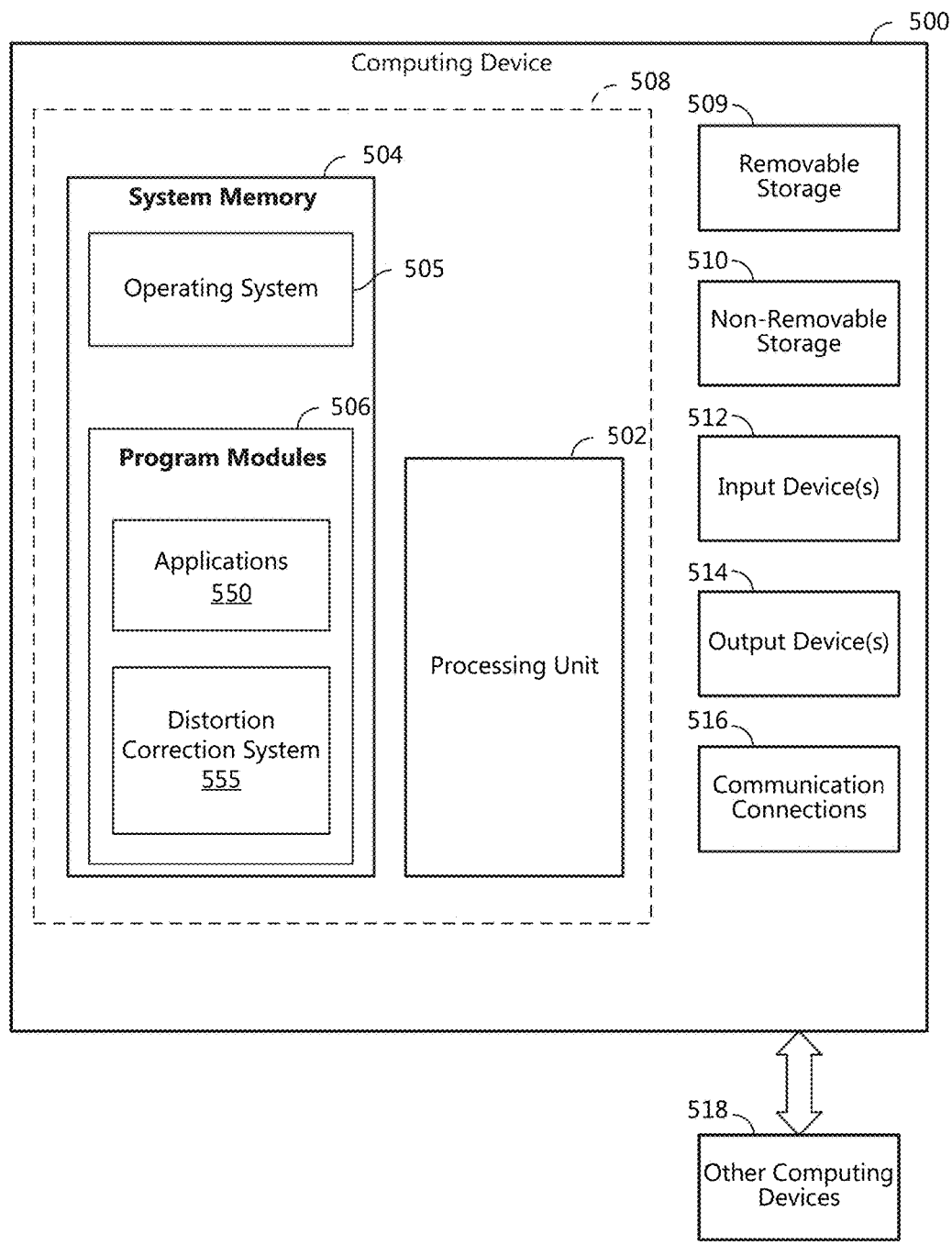
FIG. 5 is a block diagram illustrating example physical components of a computing device.

FIGS. 5 and 6 and the associated descriptions provide a discussion of a variety of operating environments in which examples are practiced. However, the devices and systems illustrated and discussed with respect to FIGS. 5 and 6 are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes the distortion correction system 555. The operating system 505, for example, is suitable for controlling the operation of the computing device 500. Furthermore, aspects are practiced in conjunction with a graphics library, other operating systems, or any other application program, and are not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., distortion correction 555) perform processes including, but not limited to, one or more of the stages of the method 400 illustrated in FIG. 4. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 5 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 500 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 500 has one or more input device(s) 512 such as a keyboard, a mouse, a pen, a sound input device, a touch input device, etc. The output device(s) 514 such as a head mounted siplay, display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

Figure 6A:
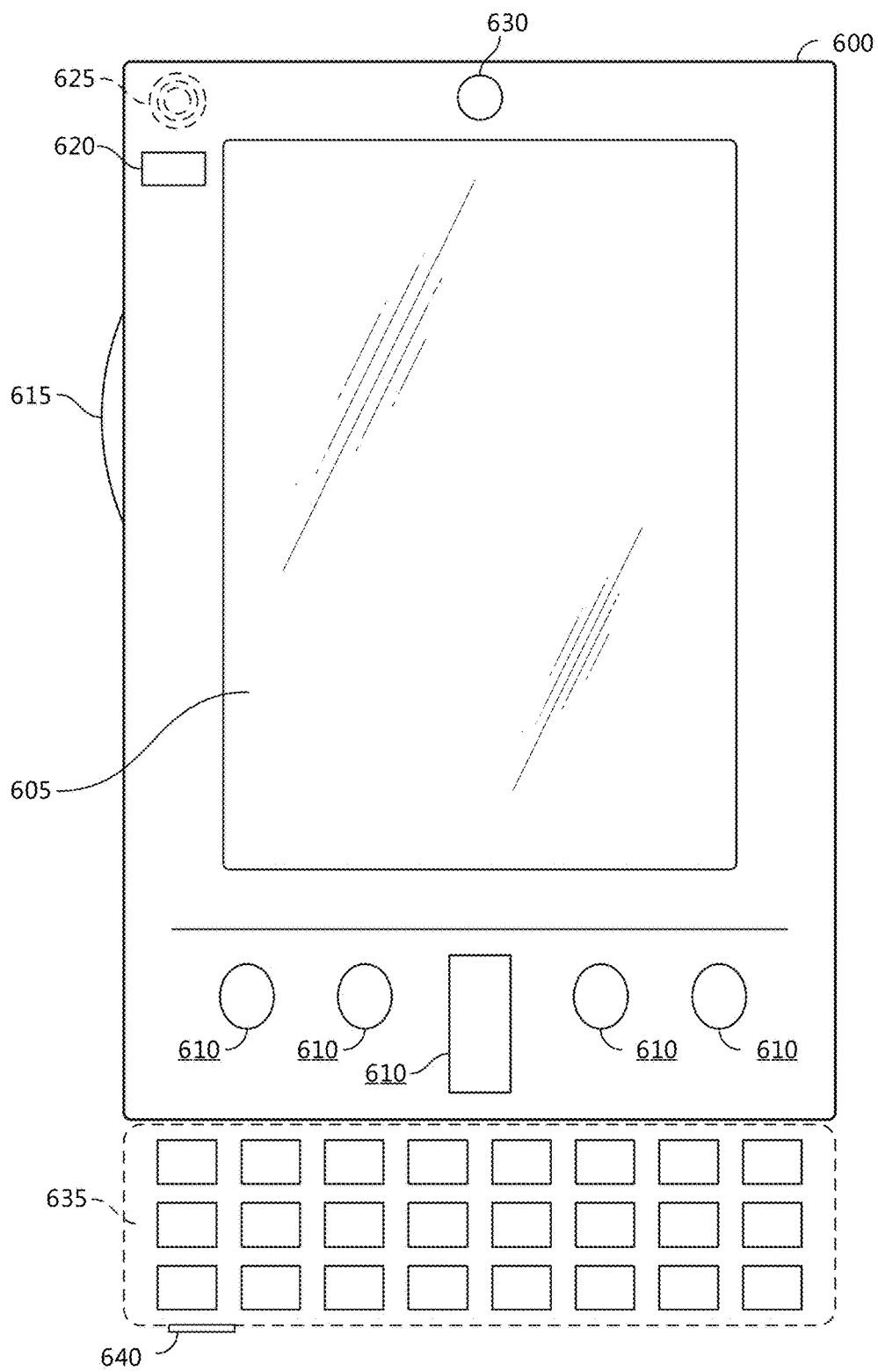
FIGS. 6A and 6B are simplified block diagrams of a mobile computing device.
Figure 6B:
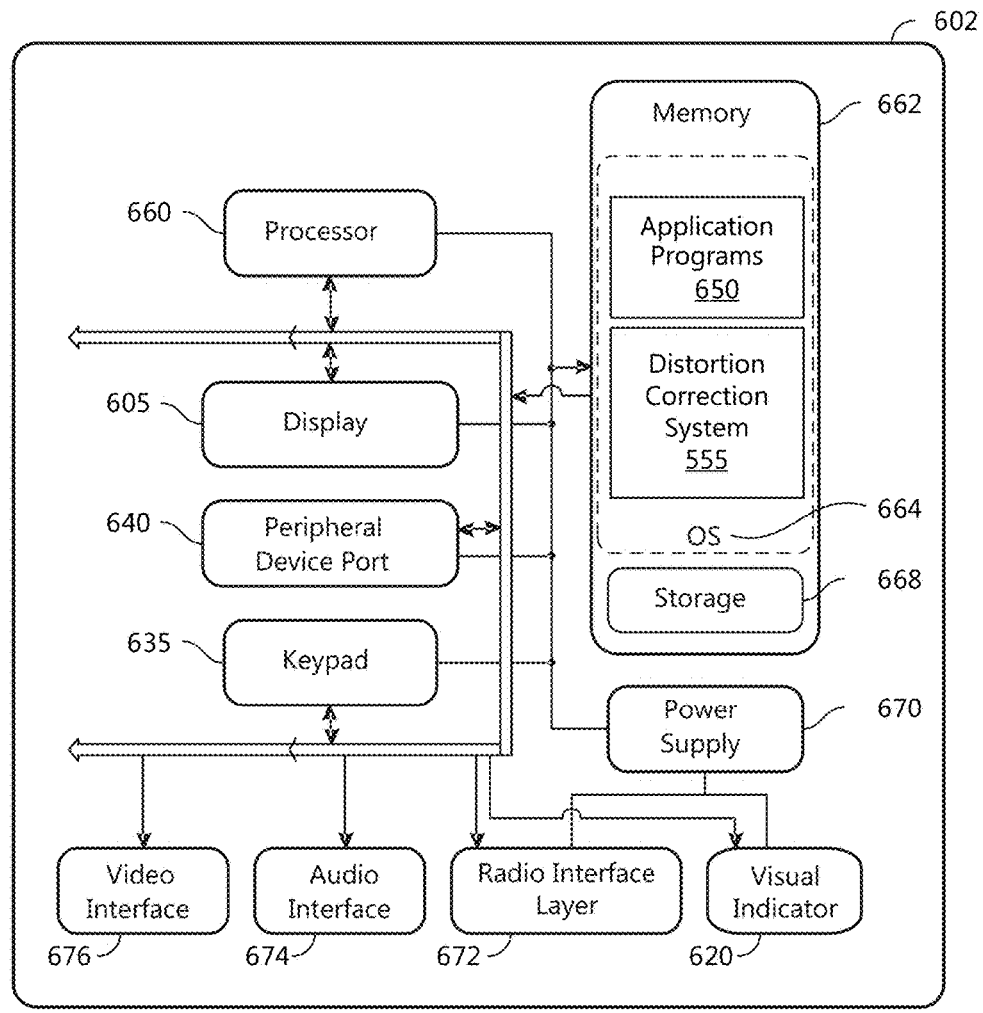

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or less input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, the distortion correction system 555 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "out-side world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 is stored locally on the mobile computing device 600, as described above. According to another aspect, the data is stored on any number of storage media that is accessible by the device via the radio 672 or via a wired connection between the mobile computing device 600 and a separate computing device associated with the mobile computing device 600, for example, a server computer in a distributed computing network, such as the Internet. As should be appreciated such data/information is accessible via the mobile computing device 600 via the radio 672 or via a distributed computing network. Similarly, according to an aspect, such data/information is readily transferred between computing devices for storage and use according to well-known data/information transfer and storage means, including electronic mail and collaborative data/information sharing systems.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

I claim:

1. A head mounted display, comprising:
   a first lens having a first curvature;
   a curved display upon which the first lens is focused, the display having a curvature such that the field curvature of the first lens is corrected by the curvature of the display;
   a processor operable with the first lens to:
      receive a planar image from an image generation device;
      determine an red undistorted image, from the planar image, for the color red;
      determine an green undistorted image, from the planar image, for the color green;
      determine an blue undistorted image, from the planar image, for the color blue; and
      generate an undistorted image from the red undistorted image, the green undistorted image, and the blue undistorted image to correct chromatic aberration associated with the first lens, wherein the processor generates the undistorted image for projection on the curved display to correct chromatic aberration.

2. The head mounted display of claim 1, wherein the curved display further comprises:
   a flat display; and
   a fiber optic bundle placed on the flat display on a first surface and a curved profile ground into a second surface opposite the first surface.

3. The head mounted display of claim 2, wherein the curved display is a transmissive display having a backlight mounted behind the curved display.

4. The head mounted display of claim 3, wherein the backlight only puts out a narrow band of the light in each of red, green, and blue lights mounted within the backlight.

5. The head mounted display of claim 4, wherein the narrow band of light is less than or equal to five nm of bandwidth for each of the red, green, and blue lights.

6. The head mounted display of claim 2 wherein the curved display is an emissive display.

7. The head mounted display of claim 6, further comprising a color filter mounted on the emissive display so as to limit the band of the wavelengths of the red, green, and blue light.

8. The head mounted display of claim 6, further comprising quantum dots on the emissive display so as to limit the band of the wavelengths of the red, green, and blue light.

9. A head mounted display, comprising:
   a first lens having a first curvature;
   a display upon which the first lens is focused; and
   a coherent fiber optic bundle sheet mounted on the display, wherein the coherent fiber optic bundle sheet has a curvature such that the field curvature of the first lens is corrected by the curvature of the coherent fiber optic bundle sheet; and
   a processor operable, with the first lens, to correct chromatic aberration associated with the first lens, wherein the display has a backlight mounted behind the display, wherein the backlight only puts out a narrow band of the light in each of red, green, and blue lights mounted within the backlight, and wherein the narrow band of light is less than or equal to five nm of bandwidth for each of the red, green, and blue lights, wherein the processor is operable to:
- receive a planar image from an image generation device;
- determine an red undistorted image, from the planar image, for the color red;
- determine an green undistorted image, from the planar image, for the color green;
- determine an blue undistorted image, from the planar image, for the color blue; and
- generate a total image from the red undistorted image, the green undistorted image, and the blue undistorted image to correct the chromatic aberration associated with the first lens.

10. The head mounted display of claim 9, wherein the coherent fiber optic bundle sheet is affixed to the display.

11. The head mounted display of claim 10, wherein the display is a flat display.

12. The head mounted display of claim 11, wherein the display is transmissive or emissive.

13. The head mounted display of claim 12, wherein the red, green, and blue undistorted images are generated for display and combined into the total image for display.

14. The head mounted display of claim 10, wherein the display is an emissive display.

15. The head mounted display of claim 14, further comprising a color filter mounted on the emissive display so as to limit the band of the wavelengths of the red, green, and blue light.

16. The head mounted display of claim 14, further comprising quantum dots on the emissive display so as to limit the band of the wavelengths of the red, green, and blue light.

17. A method of correcting chromatic aberration in a display, comprising:
- receiving a planar image;
- computing a red undistorted image, from the planar image, for the color red;
- computing a green undistorted image, from the planar image, for the color green;
- computing a blue undistorted image, from the planar image, for the color blue;
- combining the undistorted red, green, and blue undistorted images into a total image; and
- displaying the total image on a display of a head-mounted display (HMD) to correct chromatic aberration between the display and a lens of the HMD.

18. The method of claim 17, further comprising providing a display with narrowband red, green, and blue light sources to illuminate the undistorted red, green, and blue images.

19. The method of claim 17 wherein generating undistorted red, green, and blue images comprises:
- generating and displaying a red, green, and blue test pattern;
- measuring the pixel shift of each pixel of the red, green, and blue test pattern; and
- shifting the red, green, and blue images based on the measured pixel shift.

20. The method of claim 17 further comprising providing a display with narrowband red, green, and blue emissive light that projects the undistorted red, green, and blue images.

* * * * *